United States Patent Office 3,543,570
Patented Dec. 1, 1970

3,543,570
AQUEOUS BASE PENETRANT COMPOSITION
AND METHOD
Adolf Mlot-Fijalkowski, Elmwood Park, Ill., assignor to
Magnaflux Corporation, Chicago, Ill., a corporation of
Delaware
No Drawing. Filed Nov. 21, 1967, Ser. No. 684,633
Int. Cl. G01n 19/02
U.S. Cl. 73—104                                    6 Claims

ABSTRACT OF THE DISCLOSURE

An aqueous base penetrant for and method of detecting surface discontinuities in test pieces in which the penetrant comprises an oil-soluble but water-immiscible hydrocarbon solvent, preferably having a K.B. value of from 60 to 80, and an oil-soluble, but water-dispersible alkanolamide that is soluble in said hydrocarbon solvent and that increases the solubility of the dye and thus increases the sensitivity of the penetrant. The increased sensitivity is also a result of better control of the removal of the penetrant from the surface when washing with water. The inclusion in the penetrant of a sufficient proportion of a glycol type coupler, with or without a surfactant, renders the penetrant, notwithstanding its water insoluble content of hydrocarbon solvent and oil-soluble alkanolamide, miscible with water up to infinite proportions of water. This permits the penetrant to be made available in a concentrated form that can be diluted for use with any desirable amount of water, and also permits the excessive penetrant applied to the surface of the test piece to be removed by water washing alone. The aqueous base penetrant preferably contains at least one fluorescent dye and, a glycol type coupler, and optionally a nonionic surfactant and a corrosion inhibitor. For best results an alkylphenoxy polyethoxyethanol containing from 6 to 20 ethylene oxide groups per molecule is selected as the surfactant. An alkanolamide of a $C_{12}$–$C_{18}$ aliphatic fatty acid or mixture of such acids is selected that imparts a yellowing of the fluorescent dyes where the dyes are in a cascading relationship, and that retards the water washability of the excess penetrant at temperatures above about 100° F. Thus, in order to reduce the likelihood of removing any of the penetrant residue entrapped in surface discontinuities, water washing is preferably effected at a temperature of at least 100° F. The method can be carried out without the use of a developer, due to the greater fluorescent intensity of the color indication.

SUMMARY OF THE INVENTION

While it has been known, as in the Switzer et al. Pat. No. 2,920,203 and the Switzer Pat. No. 2,953,530, to provide aqueous type penetrants, employing water-soluble glycols and glycol derivatives as coupling agents, none of the prior art, to the best of my knowledge, has provided a penetrant containing a liquid hydrocarbon solvent as the solvent for the dye and a sufficient proportion of an alkanolamide that is water dispersible and that is soluble in the hydrocarbon solvent selected to increase the sensitivity of the penetrant and give better control of the water removability of the excess of penetrant during water washing. The inclusion in the penetrant of a sufficient proportion of a glycol type coupler, with or without a surfactant, renders the penetrant, notwithstanding its water insoluble content of hydrocarbon solvent and oil-soluble alkanolamide, miscible with water up to infinite proportions of water. The penetrant of my invention can be sold in its concentrated form, with or without any water content, and can be used in its concentrated form or, preferably, can be diluted with water to any desired extent. The normally liquid hydrocarbon solvent is preferably one having aromatic characteristics, and indicated by a Kauri-Butanol, or K.B. value expressed in cc. of between about 60 and 80. Such an aromatic type hydrocarbon has excellent solvent properties toward fluorescent dyes and thus makes possible higher dye concentrations and the obtaining of fluorescent color indications of high fluorescent intensity. Furthermore, the oil-soluble dye remains in a dissolved state, due to the high solvent action of the aromatic solvent having a K.B. value between 60 and 80, even when greatly diluted with water. Where fluorescent dyes are used, it is preferable to select an alkanolamide of a $C_{12}$–$C_{18}$ aliphatic fatty acid that imparts a yellowing effect to the resulting fluorescence of the indication and thereby further enhances its fluorescent intensity.

As a coupling agent, a normally liquid water-miscible glycol derivative selected from the group consisting of mono-alkyl ethers and esters of glycol and of diethylene glycol is used.

Optionally, but preferably, the penetrant of my invention also includes: as a surfactant, an alkylphenoxy polyethoxy ethanol containing from 6 to 20 ethylene oxide groups per molecule; and a rust inhibitor in an amount effective to retard corrosion of ferrous metal surfaces with which the aqueous base penetrant may come in contact.

Due to the use of alkanolamides that are oil-soluble but have a high degree of water dispersibility that is dependent upon the temperature of the water, it is possible to control the washability of the penetrant by controlling the temperature of the water used in washing off the excess of penetrant. As compared with its washability at normal or room temperatures, the washability of the penetrant is retarded when hot water, such as water at a temperature of at least 100° F. is used. By adjusting the temperature of the wash water, the excess penetrant can be washed off readily yet without causing any penetrant residue to come out of the flaws.

Due to the intensity of the fluorescent color indication using the aqueous base penetrant of my preferred composition, satisfactory color indications are obtained without the use of developers.

DETAILED DESCRIPTION OF THE INVENTION

The composition of my penetrant can be varied within the broader ranges given in the following formula:

Formula No. 1                                      Percent by weight
Liquid hydrocarbon solvent having a K.B. of
  60 to 80 _____        3–7
Oil soluble, water dispersible $C_{12}$–$C_{18}$ alka-
  nolamide _____         2–10
Water-miscible liquid glycol-type coupler ___   [1] 0–95
Nonionic surfactants, e.g., alkyl aryl poly-
  ethylene glycol ethers _____       [1] 0–25
Fluorescent dyes _____          0–1.5
Corrosion inhibitors _____          0–6
Water _____          0–80

[1] Total of one or both of these at least 10%.

As indicated by the above formula, the water-miscible glycol-type coupler and the nonionic surfactant must be present in an amount either singly or in combination, equal to at least 10% of the total formulation. If only one of these two components is used, either one of the components will impart complete water-miscibility to the penetrant, but the water-miscible glycol-type coupler particularly aids in keeping the dye, or dyes, completely in solution even though the penetrant be greatly diluted with water.

If the above formula includes one or more corrosion inhibitors in its concentrated form, the composition must include sufficient water to hold the inhibitors in solution. The corrosion inhibitors could, of course, be dissolved in the water that is used to dilute the concentrate for use, but the concentrate can be used as a penetrant without dilution with water, although less economically. Conventional corrosion inhibitors, such as sodium chromate and/or sodium nitrite can be used satisfactorily.

Suitable hydrocarbon solvents having the desired aromatic characteristics, represented by K.B. values between about 60 and 80, for use in the foregoing formula include proprietary products of Bronoco Solvents and Chemicals, a division of Ashland Oil and Refining Company, St. Louis, Mo., identified as Hi-Sol # 3, having a K.B. value of about 70; Hi-Sol #70, having a K.B. value of about 72; and Hi-Sol #30-D, having a K.B. value of about 78. Other aromatic hydrocarbon solvents within the K.B. range specified and mixtures thereof can be employed. In general, all of these aromatic hydrocarbon solvents are excellent solvents for the dye, or dyes, used. By themselves, these solvents are water-immiscible.

Examples of satisfactory oil-soluble, but water-dispersible alkanolamides are the following:

Mono- and di-ethanolamides and mono-isopropanolamides of higher ($C_{12}$–$C_{18}$) aliphatic fatty acids, such as Emcol 61, an isopropanolamide of oleic acid; and Emcol 511, which is also an alkanolamide of a higher ($C_{12}$–$C_{18}$) fatty acid, both of which are proprietary products of Witco Chemical Company and are nonionic and oil-soluble; and Stepan Chemical Company's P-616, believed to be the methanolamide of lauric acid.

A proprietary product of Stepan Chemical Co. Ninol 2012 E, or Ninol 2012 Extra, which is available as a liquid of 100% concentration and is a coconut fatty acid diethanolamide containing about 90% amide is a satisfactory substitute for the Emcol series of alkanolamides.

As water-miscible, normally liquid, glycol-type couplers, the following have been found to be satisfactory and effective.

Glycol-ethers available from Union Carbide Corporation Chemicals Division, New York, identified by their proprietary names and chemical formulae as follows:

Methyl Cellosolve—$CH_3OCH_2CH_2OH$
Cellosolve solvent—$C_2H_5OCH_2CH_2OH$
Butyl Cellosolve—$C_4H_9OCH_2CH_2OH$
Isobutyl Cellosolve—$(CH_3)_2C_2H_3OC_2H_4OH$
Methyl Carbitol—$CH_3OCH_2CH_2OCH_2CH_2OH$
Carbitol solvent—$C_2H_5OCH_2CH_2OCH_2CH_2OH$
Carbitol solvent, Low grav.—

$$C_2H_5OCH_2CH_2OCH_2CH_3OH$$

Butyl Carbitol—$C_4H_9OCH_2CH_2OCH_2CH_2OH$
Hexyl Carbitol—$C_6H_{13}OCH_2CH_2OCH_2CH_2OH$
Ucar solvent LM—$CH_3OCH_2CH(CH_3)OH$
Ucar solvent 2LM—

$$CH_3OCH_2CH(CH_3)OCH_2CH(CH_3)OH$$

Methoxytriglycol—

$$CH_3OCH_2CH_2OCH_2CH_2OCH_2CH_2OH$$

Ethoxytriglycol—

$$C_2H_5OCH_2CH_3OCH_2CH_2OCH_2CH_2OH$$

Butoxytriglycol—

$$C_4H_9OCH_2CH_2OCH_2CH_2OCH_2CH_2OH$$

1-butoxyethoxy-2-propanol—

$$C_4H_9OCH_2CH_2OCH_2CH(CH_3)OH$$

In place of any of the above-named glycol-ethers, a liquid water-miscible glycol ester, e.g., methyl Cellosolve acetate or Carbitol acetate can be used.

As surfactants that are suitable for use in my aqueous base penetrant, the following have been found to be satisfactory:

Proprietary nonionic surfactants of Jefferson Chemical Co., identified as Surfonic N-200, Surfonic N-150, and Surfonic N-120, all of which are said to be alkyl aryl polyethylene glycol ethers and are believed to contain respectively, 20, 15, and 12 ethylene oxide groups per molecule.

In place of the alkyl aryl polyethylene glycol ethers, but with some adjustment of the formula, one can use proprietary nonionic surfactants of Shell Chemical Company, such as Neodol 25-12, which is a $C_{12}$-$C_{15}$ linear, primary alcohol ethoxylate with 9 moles of ethylene oxide per mole of alcohol; and Neodol 25-15, which is similar to Neodol 25-12 but contains approximately 15 ethylene oxide groups per mole. The alkyl aryl polyethylene glycol ethers containing from 6 to 20, or more, ethoxy groups per molecule are the preferred surfactants.

Fluorescent dyes, such as Fluorol 7 GA, a proprietary naphthalimide dye of General Aniline & Film Company, or Hudson Yellow, a similar fluorescent dye available from Switzer Brothers, Inc., preferably in combination with a cascading dye, such as 4-methyl-7-dimethylaminecoumarin (MDAC), Columbia Blue which is similar to MDAC, and others can be used. Where the developer employed in the penetrant method is self-developing, my aqueous base penetrant need not contain any dye, but normally at least one dye and preferably two or more fluorescent dyes are used within the percentage by weight in the concentrate of between 1 and 6 percent.

A concentrate within the broad ranges given in Formula No. 1 above can be diluted to any desired extent for use in the liquid penetrant method of detecting flaws or other surface discontinuities. The extent of dilution may be indicated by ratios of the concentrate to water of 1 to 1, 1 to 10, and even higher. No matter what the extent of water dilution, the entire composition remains as a single phase, clear liquid.

A preferred embodiment of my aqueous base penetrant in concentrated form is represented by the following:

| Formula No. 2—concentrate— | Percent by weight |
|---|---|
| Liquid hydrocarbon solvent, K.B. from 60 to 80 | 5.0 |
| Nonyl phenyl ethoxylated ethanol 20 ethoxy/mole | 10.0 |
| Isopropanolamide of oleic acid | 4.0 |
| Dipropylene glycol monomethyl ether | 7.6 |
| Diethylene glycol monobutyl ether | 6.6 |
| Fluorescent dyes— | |
| Fluorol 7 GA | 0.3 |
| MDAC | 0.3 |
| Rust inhibitors— | |
| Sodium chromate | 0.3 |
| Sodium nitrite | 0.3 |
| Water, balance. | |

The isopropanolamide of oleic acid (Emcol 61) is the preferred alkanolamide because of its yellowing effect upon the fluorescent indication, thereby imparting greater fluorescent intensity to the indication. However, as previously stated, my aqueous base penetrant can be used without any separate developer for enhancing the visibility of the color indication:

| Formula No. 3—concentrate— | Percent by weight |
|---|---|
| Ho-Sol #3 | 4.8 |
| Emcol 61 | 4.0 |
| Surfonic N-150 | 16.4 |
| Butyl Carbitol | 7.6 |
| Fluorol 7 GA | 0.3 |
| MDAC | 0.3 |
| Corrosion inhibitors | 0.2 |
| Water | 66.4 |
| Total | 100.0 |

The method of using my aqueous base penetrant for the detecting of surface discontinuities, in general, is the same as any liquid penetrant method, in that it includes the steps of applying to the surface of the test piece a liquid penetrant which is capable of wetting the surface and becoming entrapped in any surface discontinuities; removing the excess penetrant from the surface without removing the penetrant residue entrapped in any surface discontinuity; applying a developer, if necessary, to enhance the visibility of the resulting color indication; and then viewing the indication under the appropriate lighting, such as "black light" where fluorescent dyes are used, to determine the location and extent of the surface flaws.

In the method of using my aqueous base penetrant, after the application of the penetrant, the excess penetrant remaining on the surface is removed by water washing, but preferably with adjustment of the temperature of the wash water to a temperature above about 100° F. to insure that the penetrant residue entrapped in any of the flaws or defects is not removed, but is left therein. Where the liquid hydrocarbon solvent has a K.B. value of between 60 and 80, and a water dispersible, but oil-miscible alkanolamide, such as Emcol 61, is used, the higher the temperature of the water used in washing, the less readily will the excess penetrant be washed out of any surface discontinuities. By adjusting the temperature of the wash water to at least 100° F., or higher, this desirable result is effected, despite the fact that a sufficient proportion of coupling agent, such as a water-miscible glycol ether or ester and/or nonionic surfactant is employed to insure that the penetrant as a whole is completely miscible with water and that it therefore will remain as a single phase liquid, without separation of the oil-soluble fluorescent dyes, if present, whatever the dilution with water may be.

After applying my aqueous base penetrant to the surface of the test piece, it is usually desirable to leave the penetrant on the surface for from several minutes to as long as 20 minutes, during which time the excess penetrant dries out to a considerable extent, due to the loss of water content, leaving behind the nonaqueous ingredients of the penetrant composition. Such substantially water-free penetrant residue is nevertheless completely soluble in water alone, and can be removed by water washing at a temperature adjusted to give the desired results, as described above.

It will be understood that modifications and variations may be effected without departing from the scope of the novel concepts of the present invention.

I claim:

1. A liquid penetrant composition for use in both concentrated and water-diluted forms in the penetrant method of detecting surface discontinuities in a test piece, said composition consisting essentially of the following ingredients within the indicated percentages by weight:
   from 3 to 7 of an oil soluble but water-immiscible hydrocarbon solvent having a Kauri-Butanol value of from about 60 to 80; from 2 to 10% of an oil soluble, water dispersible $C_{12}-C_{18}$ alkanolamide;
   from 0 to 95% of a normally liquid water-miscible glycol-type coupler;
   from 0 to 25% of a nonionic surfactant;
   the total of said water-miscible glycol-type coupler and of said nonionic surfactant present being at least 10% of said composition and capable of imparting water-miscibility to the resulting penetrant composition;
   and from 0 to 80% of water.

2. A penetrant composition as defined by claim 1, wherein said glycol-type coupler is selected from the group consisting of water-miscible glycol-ethers and glycol esters.

3. A penetrant composition as defined by claim 2, wherein said water dispersible alkanol amide is an alkanolamide of a $C_{12}-C_{18}$ aliphatic fatty acid;
   said surfactant is an alkyl aryl polyethylene glycol ether containing from 6 to 20 ethylene oxide groups per molecule; and
   said glycol-type coupler is a mixture of dipropylene glycol monomethyl ether and diethylene glycol monobutyl ether.

4. In a method for the detection of surface discontinuities by the liquid penetrant technique in which a liquid penetrant is applied to the surface of a test piece, the excess of penetrant is removed from said surface without removing penetrant residue entrapped in any surface discontinuity and said surface thereafter inspected for flaw indications, the improvement which comprises:
   applying as the penetrant the liquid composition defined by claim 1, and removing the excess of penetrant with water.

5. In a method for the detection of surface discontinuities by the liquid penetrant technique in which a liquid penetrant is applied to the surface of a test piece, the excess of penetrant is removed from the surface without removing penetrant residue entrapped in any surface discontinuity and said surface thereafter is inspected for flaw indications, the improvement which comprises:
   applying as the penetrant the liquid composition defined by claim 2, and removing the excess of penetrant with water.

6. In a method for the detection of surface discontinuities by the liquid penetrant technique in which a liquid penetrant is applied to the surface of a test piece, the excess of penetrant is removed from said surface without removing penetrant residue entrapped in any surface discontinuity and said surface thereafter inspected for flaw indications, the improvement which comprises:
   applying as the penetrant the liquid composition defined by claim 3.

References Cited

UNITED STATES PATENTS 3,114,039   12/1963   Switzer _____ 250—71

TOBIAS E. LEVOW, Primary Examiner

A. P. DEMERS, Assistant Examiner

U.S. Cl. X.R.

250—71; 252—408, 301.2